(12) United States Patent
Giorgio Bort et al.

(10) Patent No.: US 10,830,347 B2
(45) Date of Patent: Nov. 10, 2020

(54) HYDRAULIC DRIVELINE WITH A SECONDARY MODULE

(71) Applicant: DANA ITALIA S.R.L., Arco (IT)

(72) Inventors: Carlos Maximiliano Giorgio Bort, Levico Terme (IT); Davide Moser, Trento (IT); Giulio Ornella, Arco (IT)

(73) Assignee: DANA ITALIA S.R.L., Arco (IT)

( * ) Notice: Subject to any disclaimer, the term of this patent is extended or adjusted under 35 U.S.C. 154(b) by 29 days.

(21) Appl. No.: 16/309,617

(22) PCT Filed: Jun. 12, 2017

(86) PCT No.: PCT/EP2017/064321
§ 371 (c)(1),
(2) Date: Dec. 13, 2018

(87) PCT Pub. No.: WO2017/216121
PCT Pub. Date: Dec. 21, 2017

(65) Prior Publication Data
US 2019/0331217 A1 Oct. 31, 2019

(30) Foreign Application Priority Data
Jun. 13, 2016 (EP) .................................... 16425051

(51) Int. Cl.
*F16H 61/4096* (2010.01)
*B60K 6/12* (2006.01)
(Continued)

(52) U.S. Cl.
CPC .......... *F16H 61/4096* (2013.01); *B60K 6/12* (2013.01); *B60K 11/06* (2013.01); *B60S 9/10* (2013.01);
(Continued)

(58) Field of Classification Search
CPC ...... B60K 6/12; E02F 9/2217; F16H 61/4078; F16H 61/4096
See application file for complete search history.

(56) References Cited

U.S. PATENT DOCUMENTS

2008/0104952 A1\* 5/2008 Shiozaki ............... E02F 9/2217
60/413
2008/0110166 A1 5/2008 Stephenson
(Continued)

FOREIGN PATENT DOCUMENTS

| WO | 2015117962 | 8/2015 |
|---|---|---|
| WO | 2015144349 | 10/2015 |
| WO | 2015171692 | 11/2015 |

OTHER PUBLICATIONS

European Patent Office, International Search Report with written opinion issued in PCT/EP2017/064321, dated Jun. 9, 2017, 10 pages, European Patent Office, Rijswijk, Netherlands.

*Primary Examiner* — Brian L Swenson
(74) *Attorney, Agent, or Firm* — McCoy Russell LLP

(57) ABSTRACT

A hydraulic driveline for a vehicle may have a main hydraulic circuit with a first hydraulic displacement unit and a second hydraulic displacement unit. The driveline may have a hydraulic accumulator assembly which is selectively fluidly connected to the main hydraulic circuit by one or more controllable valves of a first group of valves. The driveline may also have a first secondary module that has a first fluid communication of the hydraulic accumulator assembly with a first secondary hydraulic load of the hydraulic driveline. The first fluid communication may be one or more controllable valves that allow connecting the hydraulic accumulator assembly with the first secondary load or separating the hydraulic accumulator assembly from the first secondary load and that belong to a second group of valves. The controllable valves of the second group of valves are con- (Continued)

trollable independently of the controllable valves of the first group of valves.

19 Claims, 4 Drawing Sheets

(51) Int. Cl.
*B60K 11/06* (2006.01)
*B60S 9/10* (2006.01)
*B60T 13/14* (2006.01)
*E02F 9/22* (2006.01)
*F16H 61/4035* (2010.01)
*F16H 61/44* (2006.01)

(52) U.S. Cl.
CPC ............ *B60T 13/14* (2013.01); *E02F 9/2217* (2013.01); *E02F 9/2225* (2013.01); *E02F 9/2292* (2013.01); *E02F 9/2296* (2013.01); *F16H 61/4035* (2013.01); *F16H 61/44* (2013.01)

(56) References Cited

U.S. PATENT DOCUMENTS

| | | | | |
|---|---|---|---|---|
| 2008/0276606 | A1* | 11/2008 | Petre | B60K 6/12 60/413 |
| 2008/0277230 | A1* | 11/2008 | Youtt | B60K 6/12 192/57 |
| 2008/0279700 | A1* | 11/2008 | Anderson | B60K 6/12 417/390 |
| 2012/0240564 | A1* | 9/2012 | Wesolowski | B60K 6/12 60/327 |
| 2017/0072778 | A1* | 3/2017 | Ornella | F16H 61/4096 |
| 2017/0113691 | A1* | 4/2017 | Meehan | F16H 61/4078 |
| 2017/0159678 | A1* | 6/2017 | Peterson | E02F 3/34 |

* cited by examiner

HYDRAULIC DRIVELINE WITH A SECONDARY MODULE

BACKGROUND

The present invention primarily relates to a hydraulic driveline for a vehicle comprising a main hydraulic circuit, a primary hydraulic load and a hydraulic accumulator assembly for hydraulic energy storage and a hydraulic secondary module and to methods of operating the driveline. Hydraulic hybrid transmissions of this kind can typically be found in off-highway vehicles and working machines used in agriculture, mining or construction, such as tractors, wheel loaders, wheeled excavators, backhoe loaders, telehandlers, dumpers, or the like.

Closed circuit configurations and hydraulic pressures up to 420-450 bar are commonly used for hydrostatic travel functions in heavy-duty operating machines, while open circuit configurations and hydraulic pressures up to 250-300 bar are more common for secondary functions like work functions and other levels of hydraulic pressures may be used for other secondary functions like auxiliary functions. Hence, the efficient and flexible operation of systems including both hydraulic travel functions and secondary functions continues to pose a challenge to developers.

An important percentage of a life of a working machine consists of being placed in an idling condition, without any request from the operator, in the idling condition, the working machine is stopped and an engine of the working machine is operating at a minimal speed. In the idling condition, the engine of the working machine, which may be an internal combustion engine, could be shut off in order to reduce fuel consumption of the working machine. A hydraulic accumulator assembly can provide hydraulically stored energy that supports the function of secondary modules of the working machine.

WO 2015/144349 teaches a hydraulic driveline for a vehicle with a hydraulic accumulator assembly, a system of shuttle valves that react on a given pressure situation in the main circuit and in the accumulators and which regulate automatically which connection between the main circuit, the accumulators and a secondary function (pilot pressure) is established.

According to WO2015/117962 valves between the accumulators, the main circuit and the work function are switching valves that do not allow an independent establishment of a fluid connection between the accumulators and the main circuit on one hand and of a fluid connection between the accumulators and the working function on the other.

SUMMARY

It is therefore an object of the present invention to design a hydraulic driveline comprising hydraulic travel functions and secondary functions as well as a hydraulic accumulator assembly that may be operated with a high degree of flexibility and efficiency.

This object is solved by a hydraulic driveline according to claim 1. Special embodiments are described in the dependent claims.

Thus, a hydraulic driveline for a vehicle is proposed, in particular for use in an automotive vehicle, comprising:
a main hydraulic circuit with a first hydraulic displacement unit which is fluidly connected with a second hydraulic displacement unit, said second hydraulic displacement unit forming a primary hydraulic load of the driveline, the first hydraulic displacement unit having a variable hydraulic displacement and being drivingly connected with a combustion engine,
wherein the driveline further comprises a hydraulic accumulator assembly which is selectively fluidly connected to the main hydraulic circuit by one or more controllable valves of a first group of valves, and
wherein the driveline further comprises a first secondary module that comprises a first fluid communication of the hydraulic accumulator assembly with a first secondary hydraulic load of the hydraulic driveline wherein the first fluid communication comprises one or more controllable valves that allow connecting the hydraulic accumulator assembly with the first secondary load or separating the hydraulic accumulator assembly from the first secondary load and that belong to a second group of valves, wherein the controllable valves of the second group of valves are controllable independently of the controllable valves of the first group of valves.

As the accumulator assembly is selectively fluidly connected to the hydraulic circuit comprising the first hydraulic displacement unit, hydraulic energy stored in the accumulator assembly may be used to deliver energy to a secondary load. This energy may be delivered to the secondary load while the main hydraulic circuit is operating and the first hydraulic displacement unit is driven by the combustion engine, but also when the combustion engine is not running, at least for a certain time. The hydraulic energy may be fed into the hydraulic accumulator assembly by the first hydraulic displacement unit through the main hydraulic circuit and through one or more controllable valves. The hydraulic energy may also be fed into the hydraulic accumulator assembly through respective controllable valves by an additional hydraulic displacement unit that serves primarily to generate hydraulic pressure for driving secondary loads, like e. g. hydraulic working functions. The additional hydraulic displacement unit may also be driven mechanically by the combustion engine that is connected to the first hydraulic displacement unit. It is, however, also possible to provide an additional combustion engine for driving the additional hydraulic displacement unit.

The main hydraulic circuit usually comprises a first main fluid line fluidly connecting or selectively fluidly connecting a first fluid port of the first hydraulic displacement unit to a first fluid port of the second hydraulic displacement unit, and a second main fluid line fluidly connecting or selectively fluidly connecting a second fluid port of the first hydraulic displacement unit to a second fluid port of the second hydraulic displacement unit. The hydraulic accumulator assembly may be selectively fluidly connected through controllable valves to the first main fluid line and/or to the second main fluid line. A minimum hydraulic or hydrostatic pressure in the hydraulic circuit may be 10 bar or at least 20 bar.

The driveline may comprise a pair of isolation valves adapted to selectively fluidly isolate or disconnect the second hydraulic displacement unit from the first hydraulic displacement unit. Fluidly isolating the second hydraulic displacement unit from the first hydraulic displacement unit may be useful when starting the engine in order to disengage the vehicle output.

The first hydraulic displacement unit may include a hydraulic, typically hydrostatic pump. For example, the first hydraulic displacement unit may be a hydrostatic radial piston pump or a hydrostatic axial piston pump having a moveable swashplate. The second hydraulic displacement unit may include a hydraulic, typically hydrostatic motor.

Like the first hydraulic displacement unit, the second hydraulic displacement unit may have a variable hydraulic displacement. The second hydraulic displacement unit may be a hydrostatic radial piston motor or a hydrostatic axial piston motor having a moveable swashplate. Usually, the second hydraulic displacement unit is drivingly engaged or selectively drivingly engaged with a vehicle output. The vehicle output may include at least one of a drive shaft, a final drive, a vehicle axle and wheels, for example.

The hydraulic driveline usually is part of a hydraulic driveline system which typically comprises an electronic control unit. Controllable valves of the system are usually controlled by the electronic control unit. The electronic control unit is usually connected with the controllable valves by a non hydraulic communication line, typically a cable or wire or by other means of communication like a radio or ultrasound communication. The electronic control unit is usually further connected with sensors, for example pressure sensors and/or flow sensors that are located in a compartment that is in fluid communication with the main hydraulic circuit or the accumulator assembly or one single accumulator or another hydraulic line that may be in communication with a secondary module.

The fact that the controllable valves of the second group of valves are controllable independently of the controllable valves of the first group of valves generates a high level of flexibility and efficiency for the control by the control unit. Different controllable valves connecting the main hydraulic circuit with the hydraulic accumulator assembly may be opened or closed independently of the status of other valves of the first or second group of controllable valves.

Optionally, the hydraulic accumulator assembly may be fluidly connectable with the first secondary module independently of the fluid connection of the hydraulic accumulator assembly with the main hydraulic circuit. Optionally, the fluid connection of the hydraulic accumulator assembly with the first secondary module may be controllable independently of the fluid connection of the hydraulic accumulator assembly with the main hydraulic circuit. Optionally, the fluid connection of the hydraulic accumulator assembly with the first secondary module may be controlled independently of the fluid connection of the hydraulic accumulator assembly with the main hydraulic circuit. In particular, the fluid connection of the hydraulic accumulator assembly with the first secondary module may be established or separated independently of the fluid connection of the hydraulic accumulator assembly with the main hydraulic circuit. Accordingly, a level of flexibility and efficiency of the system may be increased.

The electronic control unit may be connected to one or more pressure sensors that allow measuring hydraulic pressures at different points in the hydraulic system. The control unit may determine necessary actions such as closing and/or opening valves taking into account the measured pressure values. This creates a difference to the prior art where there are only limited possibilities to open and/or close certain hydraulic lines at the same time.

If, for example for safety reasons, certain conditions have to be met and certain combinations of open and closed connections/valves have to be avoided, this may be considered by one or more sets of rules that govern the logics of the electronic control unit. The rules of the control unit may be implemented easily and at low cost, for example electronically or by software programming. Such rules may be modified more easily in an electronic control unit than in a hydraulic hardware setup like the setups known from the prior art.

The proposed driveline may comprise a charge pump drivingly engaged with the internal combustion engine. The charge pump may be in selective fluid communication with a secondary hydraulic module when the internal combustion engine is driving the charge pump. The charge pump may be fed by a low pressure fluid reservoir. The fluid reservoir may be at atmospheric pressure.

The hydraulic driveline may further comprise a second secondary module that comprises a second fluid communication of the hydraulic accumulator assembly with a second secondary hydraulic load of the hydraulic driveline wherein the second fluid communication comprises one or more controllable valves that belong to the second group of valves which are controllable independently of the controllable valves of the first group of valves.

Optionally, the hydraulic accumulator assembly may be fluidly connectable with the second secondary module independently of the fluid connection of the hydraulic accumulator assembly with the main hydraulic circuit. Optionally, the fluid connection of the hydraulic accumulator assembly with the second secondary module may be controllable independently of the fluid connection of the hydraulic accumulator assembly with the main hydraulic circuit. Optionally, the fluid connection of the hydraulic accumulator assembly with the second secondary module may be controlled independently of the fluid connection of the hydraulic accumulator assembly with the main hydraulic circuit. In particular, the fluid connection of the hydraulic accumulator assembly with the second secondary module may be established or separated independently of the fluid connection of the hydraulic accumulator assembly with the main hydraulic circuit. This may also increase a level of flexibility and efficiency of the system.

An implementation of the hydraulic driveline may further provide that the first secondary load is an auxiliary load. An auxiliary load may be a load that is neither a primary load, like, in the case of a vehicle, the drive of the wheels, nor a working hydraulic function that serves to fulfill a working task of the vehicle, that is, interact with objects that are not elements of the vehicle. Preferably, an auxiliary load may be a cooling fan for the combustion engine, a vehicle stabilizer, brakes of a vehicle or an actuator for a limited movement of a vehicle wheel.

A further implementation of the hydraulic driveline may provide that the first secondary load is a working hydraulic load. A working hydraulic load is a load that serves to fulfill a working task of the vehicle, that is, interacts with objects that are not elements of the vehicle. Preferably, a working hydraulic load is a hydraulic boom or a mechanical tool that is driven hydraulically.

A further implementation of the hydraulic driveline may provide that the second secondary load is an auxiliary load or that the second secondary load is a working hydraulic load. In yet another implementation, the first fluid communication of the hydraulic accumulator assembly with a first secondary hydraulic load of the hydraulic driveline comprises a pressure regulation valve and/or a flow regulation valve.

a pressure regulation valve may protect the secondary hydraulic load from a high pressure of the hydraulic accumulator assembly that may well be in the order of several hundred bar. A flow regulation valve may prevent an unnecessarily high flow of fluid to the secondary hydraulic load and may minimize the pressure loss in the hydraulic accumulator assembly when using the hydraulic accumulator assembly to drive the secondary hydraulic load.

In yet another implementation, the second fluid communication of the hydraulic accumulator assembly with a second secondary hydraulic load of the hydraulic driveline comprises a pressure regulation valve or a flow regulation valve for the same reasons as discussed above with regard to the first secondary hydraulic load.

The hydraulic accumulator assembly may comprise one single hydraulic accumulator having at least one compartment in which hydraulic fluid may be stored under high pressure, or a number of two or more hydraulic accumulators each having at least one compartment in which hydraulic fluid may be stored under high pressure. Different hydraulic accumulators may store hydraulic fluid at different pressure levels and different hydraulic accumulators may be connected separately by separate controllable valves to one or more secondary hydraulic loads. Pressure regulation valves or a flow regulation valves may be provided in communication lines that connect single hydraulic accumulators with single secondary loads and/or in communication lines that connect all accumulators or groups of hydraulic accumulators with single secondary loads or groups of secondary loads or with all secondary loads.

Another implementation of the hydraulic driveline may provide that the hydraulic accumulator assembly comprises at least one high pressure accumulator and at least one low pressure accumulator, wherein the pressure in the high pressure accumulator is higher than the pressure in the low pressure accumulator.

The high pressure accumulator may be selectively connected with a fluid line connecting the high pressure port of a first hydraulic displacement unit/pump with the second displacement unit while the low pressure accumulator may be selectively connected with a fluid line connecting the low pressure port of a first hydraulic displacement unit/pump with the second displacement unit. The selective connections mentioned above are preferably realized in both cases by controllable valves. The high pressure accumulator as well as the low pressure accumulator may each comprise a number of more than one compartment where hydraulic fluid is stored under high pressure.

In yet another implementation of the driveline, the high pressure accumulator and the low pressure accumulator are each connected to a connection point of the fluid communication through one of two different controllable valves of the second group of controllable valves wherein the connection point is fluidly connected or connectable to a secondary load, and wherein a pressure control valve is comprised or arranged between the high pressure accumulator and the connection point.

In this setup, the secondary load is protected from the high pressure of the high pressure accumulator while it may be directly connected with the low pressure accumulator, because the pressure level of the low pressure accumulator may be below a critical level that might endanger the secondary load.

It may also be provided that the high pressure accumulator and the low pressure accumulator are each connected to a connection point of the fluid communication through one of two different controllable valves of the second group of controllable valves and wherein the connection point is fluidly connected or connectable to a secondary load, and wherein a pressure control valve or a flow control valve is comprised or arranged between the connection point and the secondary load. In this case the secondary load may be protected by the valve from dangerous influences from both accumulators of the accumulator assembly. A flow control valve may limit the fluid consumption of a secondary load.

Another implementation of the driveline may provide that at least one secondary load comprises a working hydraulic function such as a hydraulic boom or a hydraulically actuated mechanical tool.

Yet another implementation of the driveline may provide that at least one secondary load is an auxiliary function preferably formed by but not limited to a cooling fan for the combustion engine, a vehicle stabilizer, brakes of a vehicle or an actuator for a limited movement of a vehicle wheel.

The invention apart from a hydraulic driveline refers to a hydraulic driveline system with a hydraulic driveline as discussed above, wherein the system comprises an electronic control unit configured to control one or more or all controllable valves of the first group of valves.

The invention further refers to a hydraulic driveline system wherein the system comprises an electronic control unit configured to control one or more or all controllable valves of the second group of valves. As already mentioned above, different controllable valves connecting the main hydraulic circuit with the hydraulic accumulator assembly or with single accumulators or groups of accumulators may be opened or closed by signals from the control unit independently of the status of other valves of the first or second group of controllable valves. The control unit may be connected with flow sensors and/or pressure sensors that are located at different places in the fluid lines or compartments of the hydraulic driveline system. The control unit may receive orders from an operator and the control unit may create signals in order to control one or more valves. The signals may be created in the control unit according to certain logics, following predetermined rules that provide effective, efficient and safe operation.

The rules of the control unit may be easily and flexibly implemented in an electronically or by software programming. If, for example for safety reasons, certain conditions have to be met and certain combinations of open and closed connections have to be avoided, this may be implemented by one or more sets of rules that govern the logics of the electronic control unit.

Apart from a hydraulic driveline and a hydraulic driveline system, the invention also refers to a method of operation of a hydraulic driveline as discussed above, wherein for operation of a secondary hydraulic load, first a low pressure accumulator of the accumulator assembly is connected with the secondary load, said low pressure accumulator is separated from the secondary load and then a high pressure accumulator is connected with the secondary load.

In this way, the pressure at the secondary load may be raised carefully and the pressure of the low pressure accumulator may initially be used e. g. for a piloting process. By switching over to the high pressure accumulator, the high pressure fluid consumption of the high pressure accumulator may be limited.

When or right before shutting down the combustion engine, a state of charge of the accumulator assembly may be checked in order to make sure that enough hydraulic energy is stored in the accumulator assembly, for example for re-starting the engine by a pilot pressure module. To that end, the system may be equipped with one or more pressure sensors adapted to determine a state of charge of the accumulator assembly. For example, the system may comprise a first pressure sensor for determining a hydraulic pressure in the high pressure accumulator and/or a second pressure sensor for determining a hydraulic pressure in the low pressure accumulator. The state of charge of the accumulator assembly may be characterized by at least one of the hydraulic pressure in the high pressure accumulator, the hydraulic pressure in the low pressure accumulator, and a pressure difference between the hydraulic pressure in the high pressure accumulator and the hydraulic pressure in the low pressure accumulator. The control unit may be configured to communicate with the pressure sensor(s). For example, the control unit may be configured to at least one of command the pressure sensor(s) to perform a pressure measurement, receive the result of a pressure measurement performed by the pressure sensor(s), and process the result of the pressure measurement to determine the state of charge of the accumulator assembly.

A secondary hydraulic load formed by a hydraulic actuator may be in fluid communication with the hydraulic accumulator assembly and with the hydraulic circuit through a pilot pressure portion, the pilot pressure portion comprising shuttle valves, e. g. a cascade of shuttle valves that are adapted to select a highest available hydraulic pressure from different points in the system. The highest pressure selected by the shuttle valves may then be used as a pilot pressure for controlling the hydraulic actuator. For example, the highest pressure selected by the shuttle valves may be applied or selectively applied to a hydraulic actuator for controlling a displacement of the first hydraulic displacement unit and start the combustion engine that is coupled to the first hydraulic displacement unit.

BRIEF DESCRIPTION OF THE DRAWINGS

A preferred embodiment of the presently proposed driveline and driveline system and methods is described in the following detailed description and depicted in the accompanying drawing in which.

DETAILED DESCRIPTION

Figure 1:
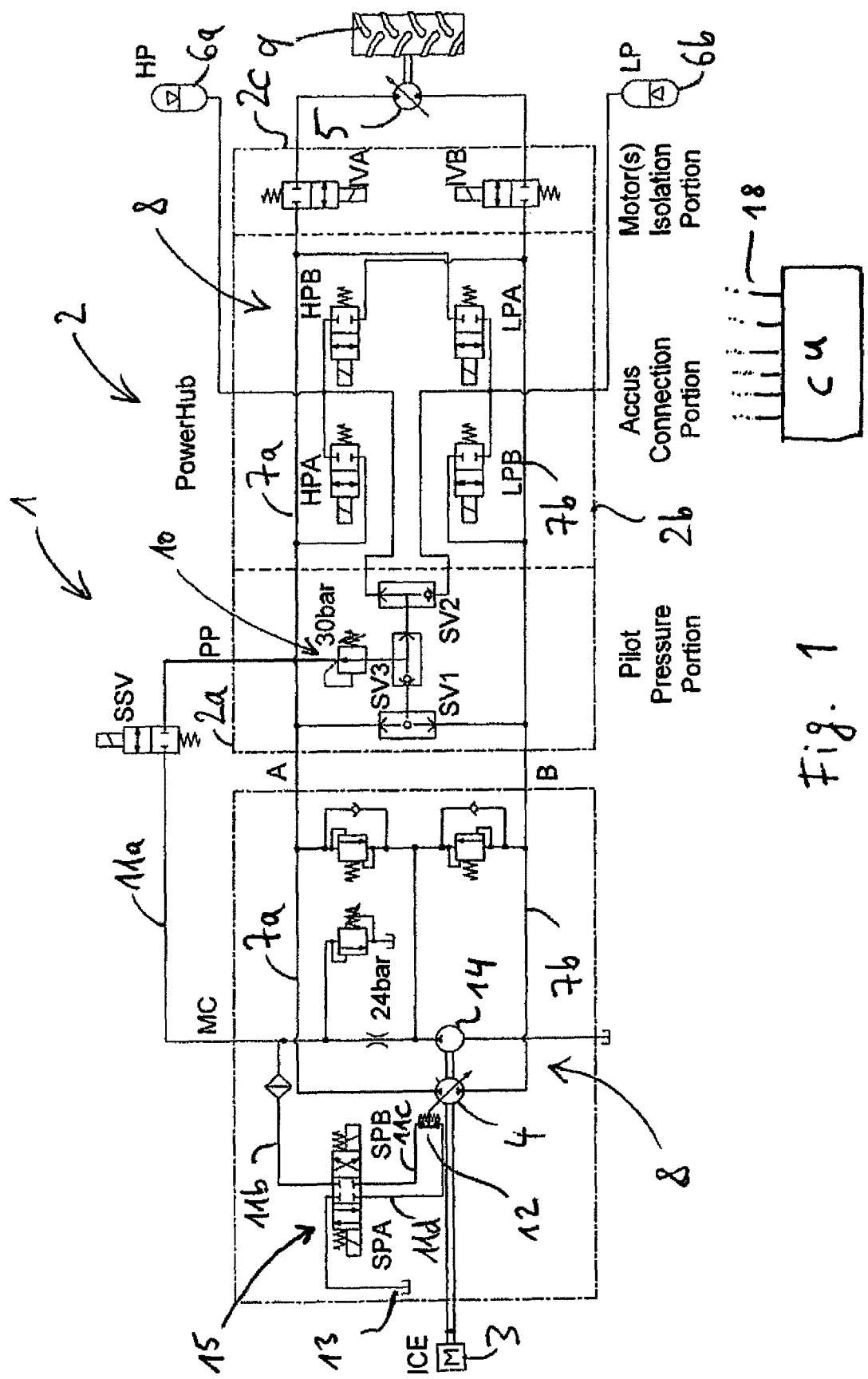
FIG. 1 shows an example of a hydraulic hybrid driveline of the prior art that forms a basis for the invention.

FIG. 1 schematically illustrates a series hydraulic hybrid driveline 1 including a powerhub 2. The hydraulic hybrid driveline 1 comprises an engine 3 that drives a hydraulic variable displacement pump 4, The powerhub 2 is located between the pump 4 and a hydrostatic variable displacement motor 5. The powerhub 2 allows the hydraulic hybrid driveline 1 to store hydraulic energy in a pair of hydraulic accumulators 6a, 6b when possible, and re-supply the hydraulic energy when needed, to save fuel or increase performance of the hydraulic hybrid driveline 1. The high pressure accumulator 6a and the low pressure accumulator 6b together form a hydraulic accumulator assembly and are configured as hydro-pneumatic bladder accumulators, for example, The pump 4 and the motor 5 are in fluid communication through a first main fluid line 7a and a second main fluid line 7b. The first main fluid line 7a, which usually has a higher pressure level than the second main fluid line 7b selectively fluidly connects a first fluid port (high pressure port) of the pump 4 to a first fluid port (high pressure port) of the motor 5 through a first isolation valve IVA. The second main fluid line 7b selectively fluidly connects a second fluid port (low pressure port) of the pump 4 to a second fluid port (low pressure port) of the motor 5 through a second isolation valve IVB. The pump 4, the motor 5 and the main fluid lines 7a, 7b form a main hydraulic circuit 8. The isolation valves IVA, IVB may be controllably connected to a control unit CU. Electrical or radio connections or other connections between controllable valves and the control unit CU in the drawings are not shown explicitly for simplicity reasons and are only indicated symbolically by the short electric line sections 18 that are connected to the control unit CU.

When the isolation valves IVA, IVB are in an open (connecting) position, the main hydraulic circuit 8 is closed so that hydraulic fluid may circulate in the main hydraulic circuit 8. For example, when the hydraulic circuit 8 is closed, mechanical energy from the engine 3 may be transmitted through the main hydraulic circuit 8 to drive a vehicle output 9 which is drivingly engaged with the motor 5. When the driveline 1 is operational, a minimum hydraulic pressure in the main hydraulic circuit 8 is usually at least 10 bar or at least 20 bar, but may well be some hundred bar.

The powerhub 2 comprises three portions: a pilot pressure portion which forms a secondary hydraulic module 2a, an accumulator connection portion 2b, and a motor isolation portion 2c. The motor isolation portion 2c comprises the two isolation valves IVA, IV8, which are 2/2-way valves which are in a normally closed position. The isolation valves IVA, IVB isolate the hydrostatic variable displacement motor (or motors) 5 from a remaining portion of the hydraulic hybrid driveline 1 when the isolation valves IVA, IVB are not actuated. As a non-limiting example, the hydrostatic variable displacement motor 5 may be isolated when the engine is not running, to facilitate hydrostatic braking.

The pilot pressure portion 2a provides the powerhub 2 with a pilot pressure port PP. The pilot pressure port PP provides a pressure suitable for pilots (for example, a pressure of about 30 bar) when the vehicle is running and/or when the accumulators 6a, 6b are pressurized. The pilot pressure portion 2a comprises three shuttle valves SV1, SV2, SV3 and a pressure reducing valve 10.

A shuttle valve typically includes a hollow body, such as a pipe, that has two inlets and one outlet. A blocking element may be freely moveable within the hollow body to selectively block one of the two inlets, thereby allowing a flow of hydraulic fluid between the inlet that is not blocked and the outlet. For example, when a first hydraulic pressure is applied to the first inlet and a second hydraulic pressure is applied to the second inlet, the first hydraulic pressure being larger than the second hydraulic pressure, the blocking element is pushed toward the second inlet, thereby blocking the second inlet. In this way, the first inlet is fluidly connected to the outlet and the hydraulic pressure at the outlet is equal to the first hydraulic pressure applied to the first inlet. Optionally, a shuttle valve may be replaced by an arrangement including at least two check valves as is readily apparent to a skilled person. For example, such an arrangement may include a first check valve providing fluid communication between a first (inlet) fluid port and an outlet fluid port, and a second check valve providing fluid communication between a second (inlet) fluid port and the outlet fluid port. In this arrangement, the first check valve may be configured to allow a flow of fluid from the first fluid port to the outlet fluid port and to block a flow of fluid from the outlet fluid port to the first fluid port, and the second check valve may be configured to allow a flow of fluid from the first fluid port to the outlet fluid port and to block a flow of fluid from the outlet fluid port to the first fluid port. In this manner, the greatest of the hydraulic pressures applied to the inlet fluid ports is selected at the outlet fluid port.

The inlet ports of the first shuttle valve SV1 are fluidly connected to the first main fluid line 7a and to the second main fluid line 7b of the main hydraulic circuit 8, respectively. Thus, at its outlet port the first shuttle valve SV1 selects a greater hydraulic pressure between the hydraulic pressure in the first main fluid line 7a and the hydraulic pressure in the second main fluid line 7b. The inlet ports of the second shuttle valve SV2 are fluidly connected to the high pressure accumulator 6a and to the low pressure accumulator 6b, respectively. Thus, at its outlet port the second shuttle valve SV2 selects a greater hydraulic pressure between the hydraulic pressure in the high pressure accumulator 6a and the hydraulic pressure in the low pressure accumulator 6b. The inlet ports of the third shuttle valve SV3 are fluidly connected to the outlet ports of the first shuttle valve SV1 and of the second shuttle valve SV2, respectively. Thus, at its outlet port the third shuttle valve SV3 selects a greater hydraulic pressure between the hydraulic pressure selected by the first shuttle valve SVI and the hydraulic pressure selected by the second shuttle valve SV2. The shuttle valves SVI, SV2 and SV3 are working autonomously without a central control by a control unit. The pressure reducing valve 10 is supplied with hydraulic pressure from the third shuttle valve SV3. The pressure reducing valve 10 reduces this pressure to a pilot pressure (for example, a pressure of about 30 bar) and supplies the reduced pressure to the pilot pressure port PP.

The pilot pressure portion 2a allows pilot pressure to be supplied when the two main fluid lines 7a, 7b do not have pressure, as the pilot pressure will be supplied from either the high pressure accumulator 6a or the low pressure accumulator 6b. Typically, pressure within the two main fluid lines 7a, 7b is supplied by the electro-hydraulic variable displacement pump 4 through the operation of the engine 3. In the hydraulic hybrid driveline 1 as described herein, the engine 3 may be placed in a non-operational condition, and thus the pilot pressure portion 2a allows pilot pressure to be supplied from either the high pressure accumulator 6a or the low pressure accumulator 6b.

Typically, in the series hydraulic hybrid driveline 1, following a braking maneuver, the high pressure accumulator 6a is charged to about a maximum pressure and the low pressure accumulator 6b is relieved of pressure to about a minimum pressure. As non-limiting examples, the maximum pressure may be about 200 bar and the minimum pressure may be about 20 bar. In the event that the operator of the hydraulic hybrid driveline 1 is not providing any commands to the hydraulic hybrid driveline 1, the engine 3 may be placed in the non-operational condition.

FIG. 1 specifically illustrates the hydraulic hybrid driveline 1 when the engine 3 is placed in the non-operational condition. Here and in the following, recurring features are designated with the same reference signs. Specific details regarding the logic used in determining when and how to place the engine 3 in the non-operational condition or return the engine 3 to an operational condition are described herein below. The engine 3 may be placed in the non-operational condition automatically by a controller (not shown) in one of two ways.

In a first way, the controller instructs an engine control unit (not shown) using a specific command that inhibits a fuel injection process. In a second way, electronic circuitry between the engine control unit and the engine 3 may be modified to allow control over the fuel injection process, allowing the fuel injection process to be inhibited or enabled on request.

Figure 2:
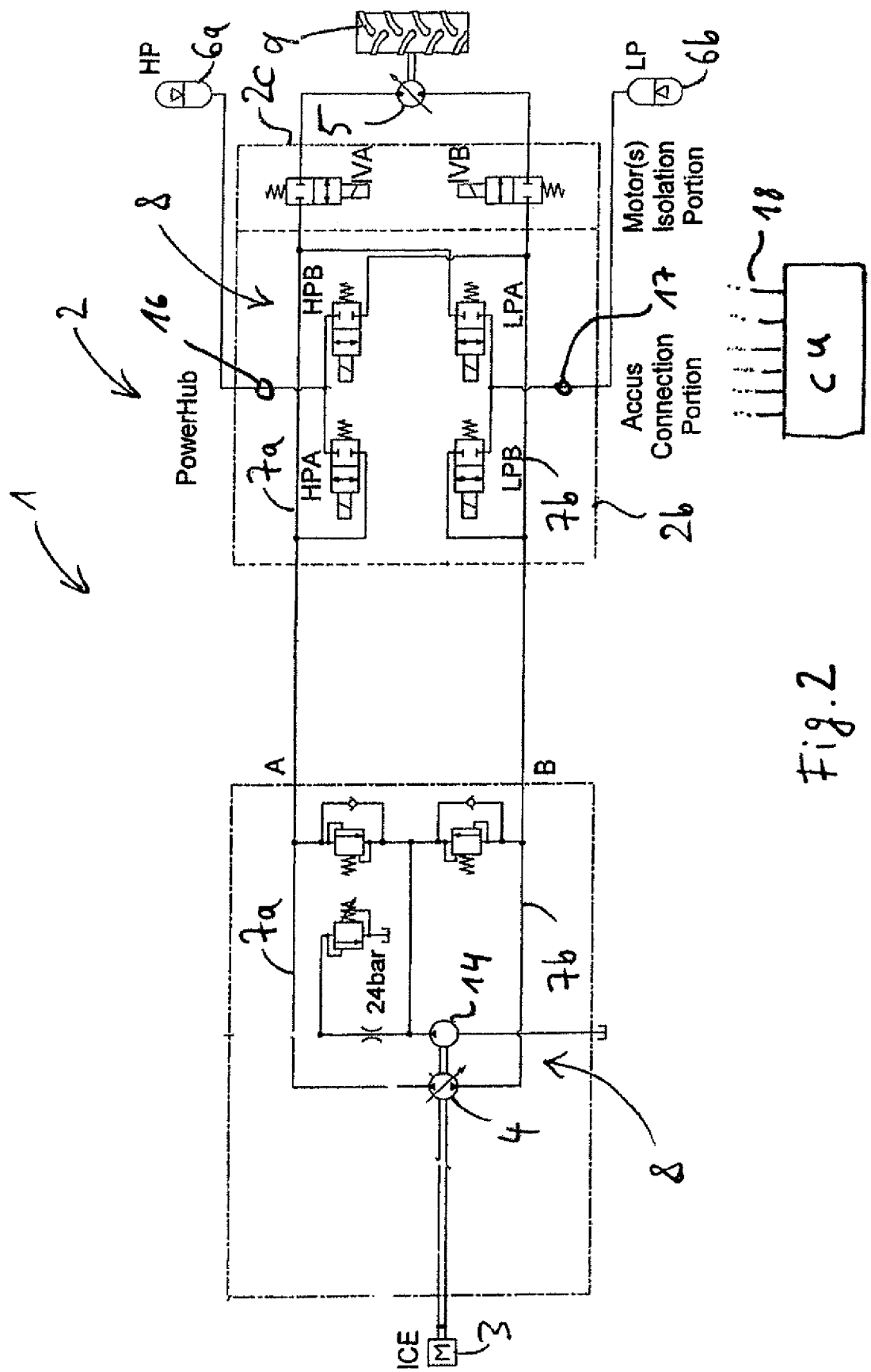
FIG. 2 shows an example of a core unit of a hydraulic driveline without secondary modules.

The hydraulic hybrid driveline 1 illustrated in FIG. 2 includes a start-stop valve SSV which provides fluid communication between the pilot pressure port PP of the powerhub 2 and a charge pump pressure measuring port MC. In FIG. 1, the valve SSV is in a closed position in which no hydraulic fluid may flow through the valve SSV. That is, in FIG. 2 the valve SSV fluidly disconnects the pilot pressure port PP from the charge pump measuring port MC. The charge pump pressure measuring port MC is a typical feature of hydraulic variable displacement pumps.

FIG. 1 further illustrates the following operational conditions:

The engine 3 is placed in the non-operational state and a moveable swashplate of the hydrostatic pump 4 is automatically swiveled into a zero displacement position, resulting in no hydraulic pressure being applied to the main fluid lines 7a, 7b. The hydrostatic motor 5, which is normally fluidly connected to the main fluid lines 7a, 7b, is fluidly disconnected from the rest of the components of the powerhub 2 by closing the isolation valves IVA, IVB to facilitate a braking maneuver.

The high pressure accumulator 6a is charged or pressurized to about a maximum pressure and the low pressure accumulator 7b is relieved of pressure to about a minimum pressure.

The pilot pressure portion 2a selects the hydraulic pressure from the high pressure accumulator 6a and, through the pressure reducing valve 10, reduces it to the pilot pressure.

In the conditions illustrated in FIG. 1, the swashplate of the hydrostatic pump 4 cannot be commanded to swivel in any direction, as the pilot lines 11a-d of the hydrostatic pump 4 are not fluidly connected to any pressurized lines. Through the use of the start-stop valve SSV, however, the pilot lines 11a-d of the hydrostatic pump 4 can be provided with pilot pressure.

If a pilot pressure is provided, a hydraulic actuator 12 mechanically coupled to the swashplate of the pump 4 is supplied with the pilot pressure required to swivel out the swashplate of the hydrostatic pump 4, thereby increasing the hydraulic displacement of the pump 4 to a desired non-zero value.

The hydraulic actuator 12 includes a hydraulic piston which may be moved by changing an amount of hydraulic fluid and/or a hydrostatic pressure in corresponding actuation chambers on opposing sides of the piston. A 4/3-way pump control valve 15 selectively fluidly connects the actuation chambers of the hydraulic actuator to the pilot line lib and to a fluid reservoir 13. The pilot line 11b may be fluidly connected to the pilot pressure port PP of the pilot pressure portion 2a by opening the start-stop valve SSV. Furthermore, the pilot line 11b is fluidly connected to a charge pump 14 which is drivingly engaged with the engine 3. By actuating a first solenoid SPA of the pump control valve 15 the pump control valve 15 is switched to a first spool position In the first spool position, a first actuation chamber of the hydraulic actuator 12 is fluidly connected to the pilot line 11b and a second actuation chamber of the hydraulic actuator 12 is fluidly connected to the low pressure reservoir 13, thereby applying the pilot pressure provided by the pilot pressure portion 2a to the first actuation chamber of the hydraulic actuator 12.

The high pressure accumulator 6a may be fluidly connected to the second main fluid line 7b by actuating a high pressure accumulator valve HPB, while the low pressure accumulator 6b may be fluidly connected to the first main fluid line 7a by actuating a low pressure accumulator valve LPA. The swashplate of the hydrostatic pump 4 in this case is swiveled to direct flow from the second main fluid line 7b to the first main fluid line 7a, and the hydrostatic pump 4 is subjected to a difference of pressure. If the hydrostatic motor 5 is isolated, the hydraulic hybrid driveline 1 is not driven and the hydrostatic pump 4 works as a motor, directing flow from the high pressure accumulator 6a to the low pressure accumulator 7b, and accelerating the engine 3. This configuration is maintained until the engine 3 reaches the minimum speed to enable the fuel injection process, after which the engine is placed in the operational condition.

Once the engine 3 has reached the idling condition, the hydraulic hybrid driveline 1 can be operated as follows: The start-stop valve SSV is switched to the closed position, as pilot pressure is now provided using a charge pump 14 drivingly engaged with the engine 3, the charge pump 14 being in fluid communication with the hydraulic actuator 12 and with the fluid reservoir 13. A second solenoid SPB of the pump control valve 15 is actuated to move the piston of the hydraulic actuator 12 to swivel the swashplate of the hydrostatic pump 4 back to zero displacement. Specifically, by actuating the second solenoid SPB of the pump control valve 15 the pump control valve 15 is switched to a second spool position thereby pressurizing the second actuation chamber.

Once the swashplate of the hydrostatic pump 4 is swiveled back to zero displacement, the high pressure accumulator 6a and the low pressure accumulator 6b can be disconnected from the main fluid lines 7a, 7b without any risk of cavitations, and the pump control valve 15 (associated with the pump control valve solenoids SPA and SPB) is left in a neutral position in which the pump control valve solenoids SPA, SPB are not actuated. When switched to the neutral position, the pump control valve 15 fluidly disconnects the actuation chambers of the hydraulic actuator 12 from the low pressure reservoir 13 and from the pilot line 11b. Furthermore, even the isolation valves IVA, IVB can be actuated to fluidly connect the hydrostatic motor (or motors) 5 to the main fluid lines 7a, 7b to restore the driving condition.

FIG. 2 shows a basic version of the hydraulic driveline described above without a secondary module. FIG. 2 includes a schematic view of a series hydraulic hybrid driveline 1 including a powerhub 2. The hydraulic hybrid driveline 1 as described above, comprises an engine 3 that drives an hydraulic variable displacement pump 4. The powerhub 2 allows storing hydraulic energy in a pair of accumulators 6a, 6b when possible, and re-supplying the hydraulic energy when needed, for example to save fuel or to increase performance of the hydraulic hybrid driveline 1. The high pressure accumulator 6a and the low pressure accumulator 6b together form a hydraulic accumulator assembly. The high pressure accumulator 6a is fluidly connected to the valves HPA, HPB in a connection point 16 which is shown in FIG. 2 only for the reason to be referenced in FIGS. 3 and 4, as well as the connection point 17. In the connection point 17, the low pressure accumulator 6b is fluidly connected with the valves LPB, LPA.

The pump 4 and the motor 5 of the main hydraulic circuit 8 are in fluid communication through a first main fluid line 7a and a second main fluid line 7b. The first main fluid line 7a usually has a higher pressure level than the second main fluid line 7b. A main hydraulic circuit (8) is formed in the same way as described in connection with FIG. 1 and the function of the isolation valves IVA, IVB is the same in FIG. 2 as according to FIG. 1.

Figure 3:
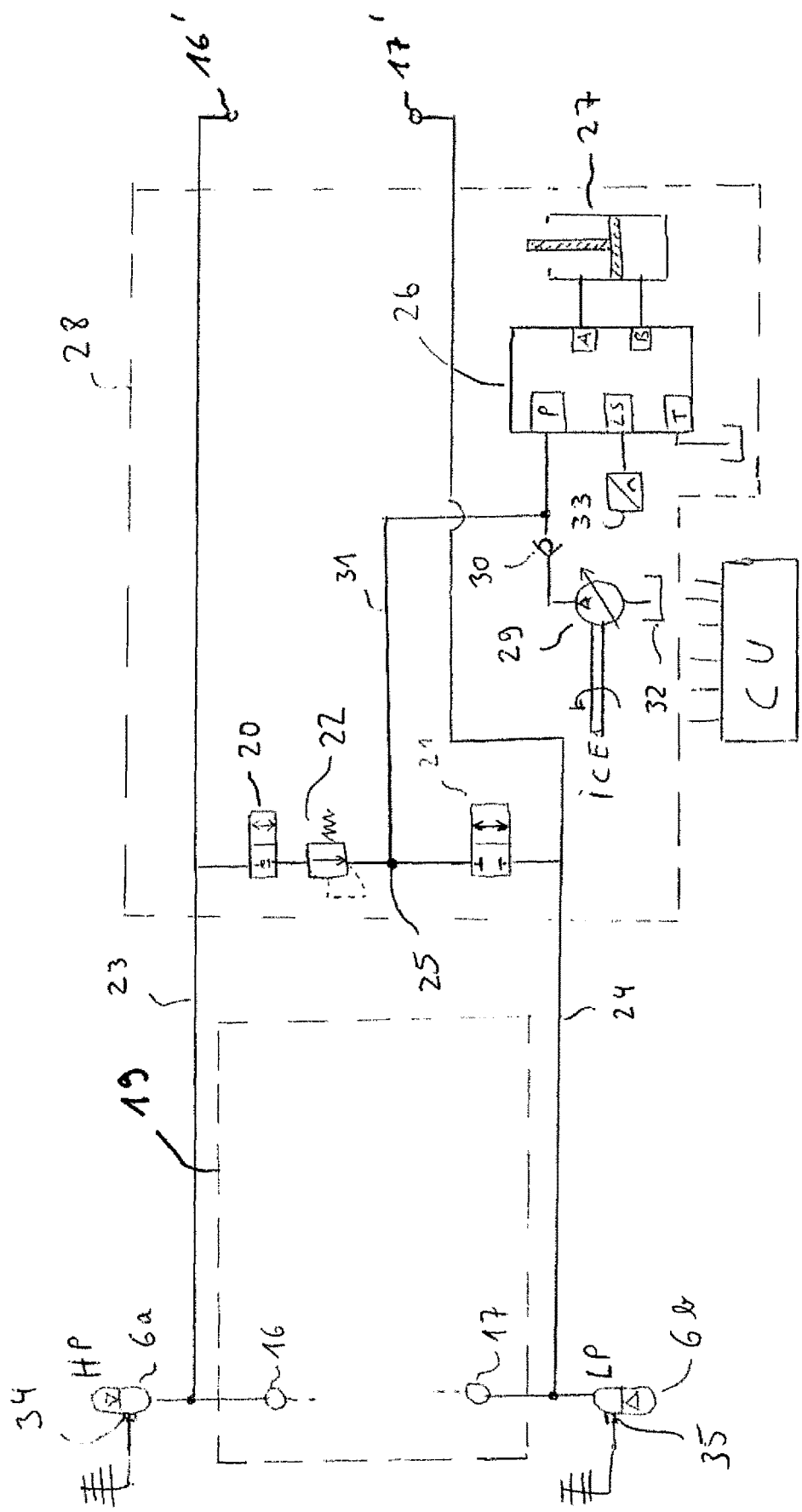
FIG. 3 shows a hydraulic driveline with a secondary module that comprises a hydraulic working function.

In FIG. 3 it is shown that a secondary module, for example a hydraulic working module, may be fluidly connected to the connection points 16, 17 as shown in FIG. 2.

In FIG. 3, the main hydraulic circuit, preferably with a power hub, further preferably with all elements that are shown in FIG. 2, is symbolically represented by the box 19. The high pressure accumulator 6a may be charged with a high pressure fluid and the low pressure accumulator 6b may be charged with a low pressure fluid. The hydraulic accumulators 6a, 6b are fluidly connected to a power hub of a hydraulic driveline through the connection points 16, 17. For the implementation of the current driveline as claimed, also other configurations of hydraulic accumulators are possible and included, like e. g. with only one single hydraulic accumulator or with more than two hydraulic accumulators. The secondary module with a hydraulic working function in FIG. 3 is indicated in FIG. 3 by the box 28.

One advantage of the configuration shown in FIG. 3 is that it permits using hydraulic energy stored in the hydraulic accumulator assembly even when the combustion engine is turned off. Usually, the hydraulic accumulator assembly may store energy that may be supplied to a working hydraulic function or that may be used for boosting the power of the primary load of the driveline. This energy may be used to begin and/or complete an action or task with a secondary module and a secondary load like e. g. a working hydraulic. The working hydraulic may be controlled independently of the hydraulic connection of the hydraulic accumulator assembly with the main hydraulic circuit as will be shown below. Thereby, the action/task of the working hydraulic may be completed without any necessity to restart the combustion engine and thus, without any additional creation of emission of combustion gases ("zero emission boom"). In parallel, also a start and stop functionality as shown in FIG. 1 may be included in the same configuration.

The hydraulic accumulator assembly may be charged by the hydraulic pump of the driveline or by the hydraulic pump of working hydraulics as well. The hydraulic accumulator assembly may also be charged by other mechanisms than the power hub, like, e. g. by a generative brake of the vehicle that feeds energy back into the main hydraulic circuit or by recovery of hydraulic energy from any working hydraulics (like e. g. when a boom is lowered by gravity). The hydraulic fluid line 23 connects the high pressure accumulator 6a with a controllable valve 20 that may be controlled by a central control unit CU.

The hydraulic fluid line 24 connects the low pressure accumulator 6b with a controllable valve 21 that may also be controlled by the control unit CU. The valves 20, 21 are fluidly connected in a point 25, which is fluidly connected with a distributor. Between the valve 20 and the connection point 25, a pressure reducing valve 22 may be provided that makes sure that the high pressure from the high pressure accumulator 6a is reduced, if the secondary load 27 or the distributor 26 would not resist the pressure level. Such a pressure reducing valve 22 or alternatively for other reasons, a flow reducing valve, could additionally or alternatively be provided between the connection point 25 and the distributor 26 to achieve other goals.

The distributor 26 may be fed with hydraulic energy by the pump 29 that may be connected with a combustion engine, for example with the same combustion engine that feeds the main hydraulic circuit or a working hydraulic function. If the pump 29 does not provide high pressure fluid, for example because the combustion engine is turned off, high pressure fluid and hence hydraulic energy may be provided by the hydraulic accumulator assembly 6a, 6b. In this case, the check valve 30, which is located between the pump 29 and the fluid line 31 prevents fluid from the hydraulic accumulator assembly to flow through the pump 29 to the low pressure reservoir 32. The fluid line 31 connects the connection point 25 with the distributor 26.

In the distributor, the fluid line 31 is connected with a pilot port P. The pilot port is connected with a piloting function that is known from the art and that provides a starting process for operation of the secondary load 27. When the piloting process is completed, high pressure fluid is delivered to one of the ports A, B and hence to the load. The distributer has the capability to control the flow of hydraulic fluid to the load independently of the pressure at its inlet port P (if the pressure level at port P is high enough).

The distributor further has a load sensing port LS for a pressure sensor 33. The load sensing port may as well be connected to a control unit CU that is connected to one or more pressure sensors. The pressure sensor 33 measures the pressure at the priority module of the distributor, therefore it senses the maximum pressure at the inlet port of each module inside the distributor. For instance, when the distributor is connected to a boom with more hydraulic actuators, the pressure sensor 33 measures the maximum of the pressure of all the hydraulic actuators. By measuring the pressure with the pressure sensor 33, it is possible provide a feedback to electronically control the displacement (or the maximum allowed displacement) of the working hydraulic pump in order to provide the correct pressure of oil needed to lift the load.

The secondary load 27 (first secondary load) may be a working hydraulic load. A working hydraulic load is a load that serves to fulfill a working task of the vehicle, that is, it interacts with objects that are not elements of the vehicle itself but objects that are outside of and independent from the vehicle. Preferably, a working hydraulic load is a hydraulic boom or a mechanical tool that is driven hydraulically.

The method of operation may be as follows:

If the combustion engine is shut down, the pressure levels of the hydraulic accumulator assembly and at the load 27 (measured by sensor 33) are monitored and compared.

If and as long as the pressure level of the hydraulic accumulator assembly, e. g. of the high pressure accumulator 6a, is higher than the pressure level of the load 27 (higher than the pressure measured by the pressure sensor 33), the accumulator 6a is connected to the distributor. The control unit CU sends a signal to the valve 20 and opens the valve 20. The high pressure hybrid accumulator 6a is connected by the fluid lines 23 and 31 to the distributor. The pressure reduction valve 22 reduces the pressure from the high pressure hydraulic accumulator 6a to a level that is acceptable for the distributor 26.

If the pressure level in the low pressure hybrid accumulator 6b is high enough and on an acceptable level, this accumulator 6b may alternatively be connected to the connection point by opening valve 21 by an appropriate command of the control unit CU.

In some systems, the priority is to keep the pilot pressure at the distributor on an acceptable level in order to make sure that a minimum piloting pressure is provided and the controllability of the secondary module is not compromised. A poor control over the module might also cause that hydraulic fluid from the accumulators to a low pressure reservoir/tank. Therefore and particularly if the secondary load is not in action, it makes sense to rather connect the low pressure accumulator to the distributor than the high pressure accumulator.

When the piloting phase is over and the secondary load shall be powered, the connection can be switched to the high pressure accumulator 6a. This switching process needs some diligence. On one hand, the two valves 21, 22 may not be open at the same time. On the other hand, the switching time during which the connection point 25 is neither connected to accumulator 6a nor to the accumulator 6b has to be short enough to avoid the loss of controllability of the hydraulic distributor 26. A non zero control volume in the pilot line or at the pilot port P or a small extra hydraulic accumulator which is connected to the port P or to the fluid line 31 may be helpful for this purpose.

A modification of the system shown in FIG. 3 could provide that the system only comprises a high pressure hydraulic accumulator 6a and no low pressure hydraulic accumulator. In this case, the controllable valve 21 could be connected to a low pressure tank in the vehicle. If no low pressure hydraulic accumulator is needed, this is a cheaper and simpler construction.

Another application of the system shown in FIG. 3 should be the combination with a start/stop functionality as shown in FIG. 1 where pilot pressure is provided by the hydraulic accumulators 6a, 6b in order to start the combustion engine 3.

The start/stop functionality can only start the engine if the energy consumption by the secondary load 27 was not excessive and the pressure level at the high pressure hydraulic accumulator 6a is sufficient to start the engine. The two accumulators 6a, 6b have to be controlled and managed appropriately in order to guarantee both a fast restart of the engine 3 and a long availability of the operation of the secondary load 27. In this context, it has to be considered, that for the functioning of the start and stop functionality, the power that is available is determined by the pressure difference between accumulators 6a and 6b. On the other hand, the energy available for the secondary load (e. g. "zero emission boom") 27 depends on the total energy in both accumulators 6a, 6b and particularly a relatively high pressure level in the low pressure accumulator 6b may be helpful in order to ensure a short idle phase in the necessary piloting phase of the hydraulic components.

For an effective and efficient management of the pressure levels of both accumulators 6a, 6b, sensors 34 and 35 are provided that are connected to the control unit CU electrically or e. g. by a radio contact, symbolized in FIG. 3 by antenna symbols. The control unit may manage the use of energy from both accumulators 6a, 6b in an appropriate way in order to ensure an optimal availability of hydraulic energy at any time. The control unit may also stop activities of the secondary module(s) if the energy that is available in the accumulators becomes lower than a predetermined value.

It should also be mentioned that in an alternative system, a start/stop functionality as shown in FIG. 1 can be combined with a secondary module as shown in FIG. 3 and only one high pressure accumulator 6a.

In FIG. 4, again, as in FIG. 3, the main hydraulic circuit, preferably with a power hub, further preferably with all elements that are shown in FIG. 2, is symbolically represented by the box 19. Again, as discussed above in connection with FIG. 3, the high pressure accumulator 6a may be charged with a high pressure fluid and the low pressure accumulator 6b may be charged with a low pressure. The hydraulic accumulators 6a, 6b again are fluidly connected to a power hub of a hydraulic driveline, through the connection points 16, 17. For the implementation of the system as further shown in FIG. 4, also other configurations of hydraulic accumulators are possible and included, like e. g. with only one single hydraulic accumulator or with more than two hydraulic accumulators.

Figure 4:
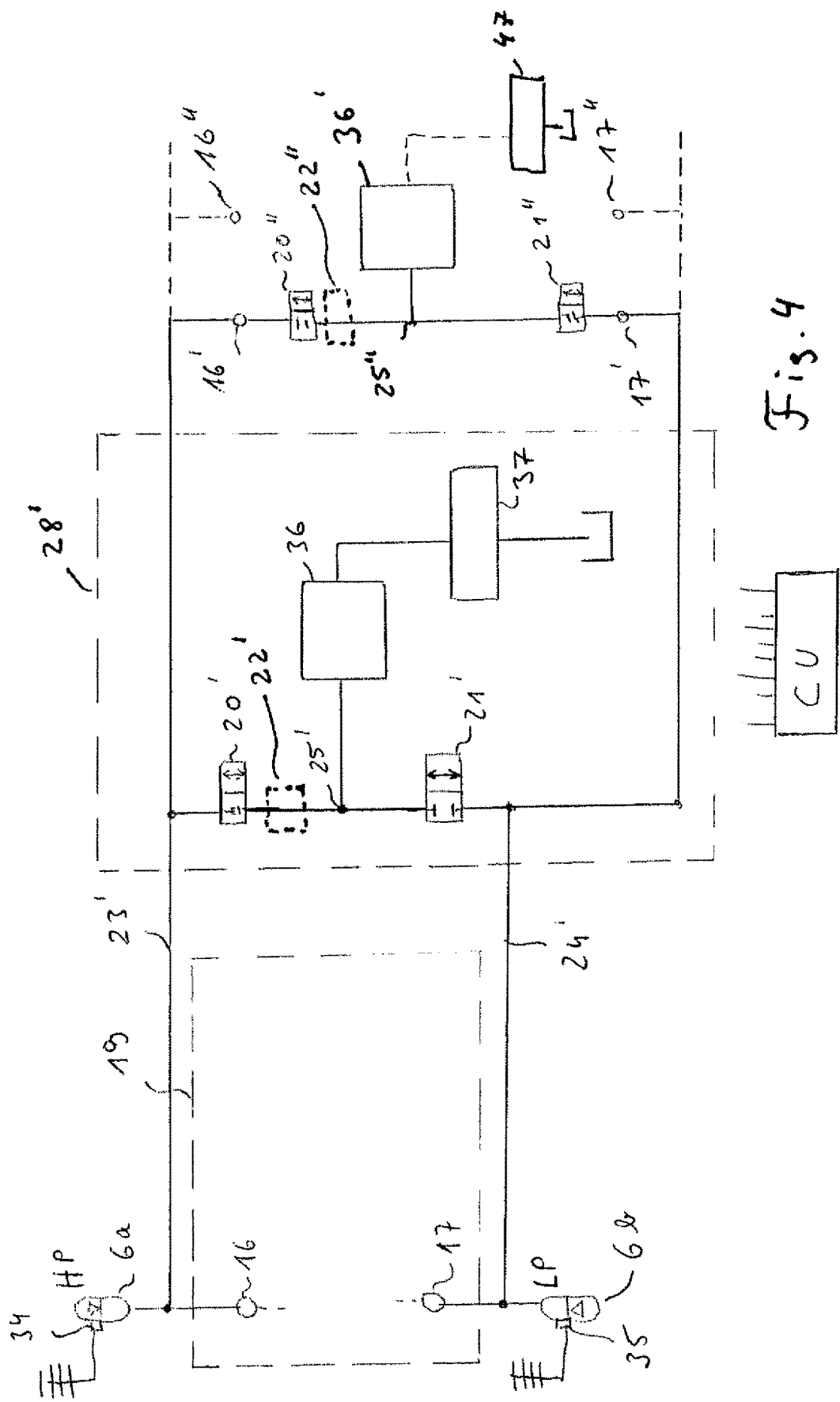
FIG. 4 shows a hydraulic driveline with a secondary module that comprises an auxiliary hydraulic function.

The secondary module with a hydraulic auxiliary function is indicated in FIG. 4 by the box 28'. The advantage of the configuration shown in FIG. 4 is that it permits to make use of hydraulic energy that is stored in the hydraulic accumulator assembly and use this energy for the activity of a secondary hydraulic module with a secondary hydraulic load formed by an auxiliary hydraulic load 37 even when the combustion engine is turned off.

The auxiliary hydraulic load 37 in FIG. 4 can be fluidly connected with the accumulators 6a, 6b by one of the fluid lines 23', 24', depending on the accumulator which shall be connected with the load 37. The fluid connection is further realized by opening (=internal connection of its inlet port with its outlet port) one of the controllable valves 20', 21', which may both be controlled by the central control unit CU. This way, the connection point 25' is connected with one of the accumulators, the auxiliary load 37 is connected with the connection point 25' by a valve 36 which may be controllable or not controllable by the control unit and which may be a pressure control valve or a flow control valve, depending on the requirements of the load 37.

An auxiliary load 37 may be a load that is neither a primary load, like, in the case of a vehicle, the drive of the wheels that serves to move the vehicle from one place to another, nor a working hydraulic function that serves to fulfill a working task of the vehicle, that is, interacts with objects that are not elements of the vehicle. Preferably but not exclusively, an auxiliary load may be formed by a cooling fan for the combustion engine, a vehicle stabilizer, brakes of a vehicle or an actuator for a limited movement of a vehicle wheel.

If the auxiliary load is a cooling fan of the combustion engine, it may be driven by a hydraulic motor. In this case, it is possible to drive the cooling fan when the engine is running (with no additional effort by the engine) or when the engine has been turned off and has to be cooled down for a certain time. In this case, the fan may be run by the energy from the hydraulic accumulator assembly as long as a determined pressure level of pressure in the accumulator assembly is available and as long as the available pressure is high enough to be appropriate for running the fan.

If the auxiliary load is a stabilizer or a group of stabilizers, they may be used before and after turning off the combustion engine and they may be used to either stabilize a vehicle or even lift it from the ground (or also lower the vehicle), thus increasing its stability and safety. The stabilizer(s) may be run by the energy from the hydraulic accumulator energy as long as a determined pressure level is available in the accumulator assembly and as long as the available pressure is high enough to be appropriate for running the stabilizer(s). The control unit may check in advance if the stored energy in the accumulator assembly is big enough to complete a planned activity by measurements carried out by pressure sensors. If this is not the case, the control unit may give a signal that the engine has to be turned on again in order to avoid a disruption of the activity.

It is also possible to disengage an automatic parking brake by the energy stored in the accumulator assembly, when or shortly before the vehicle starts to move. A brake of the vehicle (service brake) may also actuated by the control unit using energy stored in the accumulator assembly. This leads to a lower engine load when the vehicle is braking. Actuation of a brake by the accumulated hydraulic energy is, however depending on the availability of sufficient energy in the accumulator assembly.

If the auxiliary load is a steering cylinder, such a steering cylinder may easily be used for steering functions like turning the wheels of the vehicle autonomously after the combustion engine has been turned off. This may increase the safety and flexibility, particularly when the vehicle is parked on a slope. As the steering cylinders may only be run by the energy from the hydraulic accumulator energy as long as a determined pressure level of pressure in the accumulator assembly is available and as long as the available pressure is high enough for running the steering cylinders, the control unit may check in advance if the stored energy in the accumulator assembly is sufficient to complete a planned activity and give a warning signal if this is not the case or turn on the combustion engine automatically in order to charge the accumulator assembly.

In FIG. 4, further connection points 16', 16", 17', 17" are shown that represent the opportunity to add more auxiliary modules or other secondary modules to the module 28'. 'Hydraulic pressure could be provided at connection points 25" by controllable valves 20", 21". Pressure control valves and/or flow control valves 36, 36' could be provided for each single secondary load 37, 47 between the connection points 25', 25" and the respective loads 37, 47 or between the high pressure side valves 20', 20" and the respective connection points 25', 25", indicated by boxes 22', 22". It should be mentioned that in the same way as discussed with regard to FIG. 4, also in FIG. 3 one or more secondary modules could be added to the module 28.

The invention claimed is:

1. A hydraulic driveline for a vehicle, comprising:
a main hydraulic circuit with a first hydraulic displacement unit which is fluidly connected with a second hydraulic displacement unit said second hydraulic displacement unit forming a primary hydraulic load of the driveline, the first hydraulic displacement unit having a variable hydraulic displacement and being drivingly connected with a combustion engine,
wherein the driveline further comprises a hydraulic accumulator assembly which is selectively fluidly connected to the main hydraulic circuit by one or more controllable valves of a first group of valves,
wherein the driveline further comprises a first secondary module that comprises a first fluid communication of the hydraulic accumulator assembly with a first secondary hydraulic load of the hydraulic driveline,
wherein the first fluid communication comprises one or more controllable valves of a second group of valves that allow connecting the hydraulic accumulator assembly with the first secondary load or separating the hydraulic accumulator assembly from the first secondary load,
wherein the controllable valves of the second group of valves are controllable independently of the controllable valves of the first group of valves, and
wherein the fluid connection of the hydraulic accumulator assembly with the first secondary module is controllable independently of the fluid connection of the hydraulic accumulator assembly with the main hydraulic circuit.

2. The hydraulic driveline of claim 1, wherein the driveline further comprises a second secondary module that comprises a second fluid communication of the hydraulic accumulator assembly with a second secondary hydraulic load of the hydraulic driveline wherein the second fluid communication comprises one or more controllable valves, that belong to the second group of valves.

3. The hydraulic driveline of claim 2, wherein the hydraulic accumulator assembly is fluidly connectable with the second secondary module independently of the fluid connection of the hydraulic accumulator assembly with the main hydraulic circuit.

4. The hydraulic driveline of claim 2, wherein the fluid connection of the hydraulic accumulator assembly with the second secondary module is controllable independently of the fluid connection of the hydraulic accumulator assembly with the main hydraulic circuit.

5. The hydraulic driveline of claim 1, wherein the first secondary load is an auxiliary load.

6. The hydraulic driveline of claim 1, wherein the first secondary load is a working hydraulic load.

7. The hydraulic driveline of claim 1, wherein the second secondary load is an auxiliary load.

8. The hydraulic driveline of claim 1, wherein the second secondary load is a working hydraulic load.

9. The hydraulic driveline of claim 1, wherein the first fluid communication of the hydraulic accumulator assembly with a first secondary hydraulic load of the hydraulic driveline comprises a pressure regulation valve and/or a flow regulation valve.

10. The hydraulic driveline of claim 9, wherein the second fluid communication of the hydraulic accumulator assembly with a second secondary hydraulic load of the hydraulic driveline comprises a pressure regulation valve or a flow regulation valve.

11. The hydraulic driveline of claim 1, wherein the hydraulic accumulator assembly comprises at least one high pressure accumulator and at least one low pressure accumulator, wherein the pressure in the high pressure accumulator is higher than the pressure in the low pressure accumulator.

12. The hydraulic driveline of claim 11, wherein the high pressure accumulator and the low pressure accumulator are each connected to a connection point of the fluid communication through one of two different controllable valves of the second group of controllable valves and wherein the connection point is fluidly connected or connectable to a secondary load, and wherein a pressure control valve is comprised between the high pressure accumulator and the connection point.

13. The hydraulic driveline of claim 12, wherein the high pressure accumulator and the low pressure accumulator are each connected to a connection point of the fluid communication through one of two different controllable valves of the second group of controllable valves and wherein the connection point is fluidly connected or connectable to a secondary load, and wherein a pressure control valve or a flow control valve is comprised between the connection point and the secondary load.

14. A hydraulic driveline for a vehicle, comprising:
a main hydraulic circuit with a first hydraulic displacement unit which is fluidly connected with a second hydraulic displacement unit, said second hydraulic displacement unit forming a primary hydraulic load of the driveline, the first hydraulic displacement unit having a variable hydraulic displacement and being drivingly connected with a combustion engine,
wherein the driveline further comprises a hydraulic accumulator assembly which is selectively fluidly connected to the main hydraulic circuit by one or more controllable valves of a first group of valves,
wherein the driveline further comprises a first secondary module that comprises a first fluid communication of the hydraulic accumulator assembly with a first secondary hydraulic load of the hydraulic driveline,
wherein the first fluid communication comprises one or more controllable valves of a second group of valves that allow connecting the hydraulic accumulator assembly with the first secondary load or separating the hydraulic accumulator assembly from the first secondary load,
wherein the controllable valves of the second group of valves are controllable independently of the controllable valves of the first group of valves, and
wherein the hydraulic accumulator assembly may be fluidly connectable with the first secondary module independently of the fluid connection of the hydraulic accumulator assembly with the main hydraulic circuit.

15. The hydraulic driveline of claim 1, wherein at least one secondary load is a working hydraulic function formed by a hydraulic boom or a mechanical tool that is driven hydraulically.

16. The hydraulic driveline of claim 14, wherein at least one secondary load is an auxiliary function formed by a cooling fan for the combustion engine, a vehicle stabilizer, brakes of a vehicle or an actuator for a limited movement of a vehicle wheel.

17. The hydraulic driveline system of claim 14, further comprising an electronic control unit that controls one or more or all controllable valves of the first group of valves.

18. The hydraulic driveline system of claim 14, further comprising an electronic control unit that controls one or more or all controllable valves of the second group of valves.

19. A method of operating a hydraulic driveline, the method comprising:
providing a hydraulic driveline for a vehicle, the hydraulic driveline comprising:
a main hydraulic circuit with a first hydraulic displacement unit fluidly connected with a second hydraulic displacement unit, said second hydraulic displacement unit forming a primary hydraulic load of the driveline, the first hydraulic displacement unit having a variable hydraulic displacement and being drivingly connected with a combustion engine,
a hydraulic accumulator assembly selectively fluidly connected to the main hydraulic circuit by one or more controllable valves of a first group of valves, the hydraulic accumulator assembly comprising a high pressure accumulator and a low pressure accumulator,
a secondary hydraulic load, and
a secondary module comprising a first fluid communication of the hydraulic accumulator assembly with the secondary hydraulic load,
wherein the first fluid communication comprises one or more controllable valves of a second group of valves that allow connecting the hydraulic accumulator assembly with the secondary load or separating the hydraulic accumulator assembly from the secondary load, and
wherein the controllable valves of the second group of valves are controllable independently of the controllable valves of the first group of valves;
the method further comprising:
fluidly connecting the low pressure accumulator with the secondary load;
subsequently, separating the low pressure accumulator from the secondary load; and,
subsequently, fluidly connecting the high pressure accumulator with the secondary load.

* * * * *